United States Patent
Nakamura et al.

(10) Patent No.: US 7,993,431 B2
(45) Date of Patent: Aug. 9, 2011

(54) GAS PURIFIER APPARATUS AND METHOD FOR GAS PURIFICATION

(75) Inventors: Morimitsu Nakamura, Kai (JP); Masato Kawai, Yokohama (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 258 days.

(21) Appl. No.: 11/922,012

(22) PCT Filed: Jun. 14, 2006

(86) PCT No.: PCT/JP2006/311927
§ 371 (c)(1),
(2), (4) Date: Dec. 12, 2007

(87) PCT Pub. No.: WO2006/137306
PCT Pub. Date: Dec. 28, 2006

(65) Prior Publication Data
US 2009/0151558 A1    Jun. 18, 2009

(30) Foreign Application Priority Data

Jun. 24, 2005   (JP) ................................. 2005-185725

(51) Int. Cl.
*B01D 53/02* (2006.01)
(52) U.S. Cl. ................... 95/96; 95/106; 95/139; 96/108
(58) Field of Classification Search .............. 95/96, 106, 95/139; 96/108
See application file for complete search history.

(56) References Cited

U.S. PATENT DOCUMENTS

| | | | |
|---|---|---|---|
| 5,728,198 A * | 3/1998 | Acharya et al. ................. 95/114 |
| 5,891,218 A | 4/1999 | Rouge et al. |
| 5,989,313 A | 11/1999 | Mize |
| 6,048,509 A * | 4/2000 | Kawai et al. ................... 423/230 |
| 6,187,077 B1 * | 2/2001 | Li ..................................... 95/47 |
| 6,506,236 B2 | 1/2003 | Golden et al. |
| 7,524,358 B2 * | 4/2009 | Saxena et al. ................... 95/118 |
| 2004/0118279 A1 | 6/2004 | Kalbassi et al. |
| 2006/0078480 A1 | 4/2006 | Spry |

FOREIGN PATENT DOCUMENTS

| | | |
|---|---|---|
| JP | 5-337319 | 12/1993 |
| JP | 2002-346329 | 12/2002 |
| JP | 2004-154761 | 6/2004 |
| KR | 10-2000-0028859 | 5/2000 |
| WO | WO 3/097222 A1 | 11/2003 |

OTHER PUBLICATIONS

International Search Report for PCT/JP2006/311927 mailed Aug. 8, 2006.
Takeuchi et al, "Kaisetsu Kagaku Kogaku", pp. 190-195, Baifukan, 1982.
Extended European Search Report in EP 06 76 6696 mailed Oct. 15, 2010.

* cited by examiner

*Primary Examiner* — Robert J Hill, Jr.
*Assistant Examiner* — Christopher P Jones
(74) *Attorney, Agent, or Firm* — Nixon & Vanderhye P.C.

(57) ABSTRACT

A gas purifier of the present invention includes a purifier in which a gas-purifying agent is packed, wherein a gas is fed into the purifier, and impurities in the gas are removed by a thermal swing adsorption method, in which an amount A of the gas-purifying agent is determined such that an impurities-removing capacity possessed by half of the amount A of the gas-purifying agent is equal to the total amount of impurities in the gas to be purified in one purification step, and the amount of the gas-purifying agent packed in the purifier is the amount A or more.

5 Claims, 1 Drawing Sheet

GAS PURIFIER APPARATUS AND METHOD FOR GAS PURIFICATION

CROSS-REFERENCE TO RELATED APPLICATIONS

This application is the U.S. national phase of International Application No. PCT/JP2006/311927, filed 14 Jun. 2006, which designated the U.S. and claims priority to Japanese Patent Application No. 2005-185725, filed 24 Jun. 2005, the entire contents of each of which are hereby incorporated by reference.

TECHNICAL FIELD

The present invention relates to a gas purification apparatus which removes impurities contained in a gas such as carbon dioxide contained in air or carbon monoxide contained in high purity nitrogen, and to a method for gas purification using the same. In particular, the present invention relates to a gas purification apparatus and a method for gas purification which are suitable for removing carbon dioxide in feed air in cryogenic air separation. Moreover, the present invention enables a gas purification apparatus to be downsized.

Priority is claimed on Japanese Patent Application No. 2005-185725, filed Jun. 24, 2005, the contents of which are incorporated herein by reference.

BACKGROUND ART

In cryogenic air separation, unnecessary components such as moisture, carbon dioxide, a nitrogen oxide, or a hydrocarbon in feed air are previously removed, and then cryogenic air separation is performed. Recently, an adsorption method is used for this removal of unnecessary components.

This adsorption method is classified into a thermal swing adsorption method (TSA) and a pressure swing adsorption method (PSA).

In the thermal swing adsorption method, at least two adsorbers are provided and operated while switching between an adsorption step and a regeneration step. An adsorption step time and a regeneration step time correspond to each other. A regeneration step further includes a depressurizing step, a heating step, a cooling step, and a repressurizing step.

In an adsorber, a moisture adsorbent is packed at the air-inlet side, and a carbon dioxide adsorbent is packed at the latter part thereof. The aforementioned unnecessary components in air are continuously removed by alternately switching between a relatively low-temperature adsorption step and a relatively high-temperature regeneration step.

Moreover, as a moisture adsorbent, activated alumina, silica gel, K-A type zeolite, Na-A type zeolite, or Na—X type zeolite is used, and as a carbon dioxide adsorbent, Na—X type zeolite is used.

Meanwhile, when focusing on the adsorption of carbon dioxide in such a thermal swing adsorption method, since the cross-sectional area of an adsorption column is determined so that the air velocity at the inlet of an adsorbent layer is within a certain range, the determination of the amount of a carbon dioxide adsorbent to be packed in an adsorber, that is to say, the thickness of an adsorbent layer, has a practically important meaning.

Conventionally, the basic method for determining the thickness of an adsorbent layer has been as follows. When an air velocity and the cross-sectional area of an adsorption column are determined, by determining an adsorption step time, the amount x of impurities to be adsorbed in inflowing feed air is determined. The packed amount of an adsorbent is determined so that the total of the amount of impurities, which can be adsorbed in an adsorption equilibrium part, and the amount of impurities, which can be adsorbed in a mass transfer zone part, is equal to the amount x of impurities, or more.

That is, the sum of the length of an adsorption equilibrium part and the length of a mass transfer zone part in an adsorbent layer is considered to correspond to the thickness of the adsorbent layer (packed height). This design method is described in for example "Kaisetsu Kagaku Kougaku" page 190 to 195, written by Takeuchi et al., Baifukan, published Jan. 15, 1982 (see non-patent reference 1).

FIG. 2 illustrates the concept of such a conventional method, representing the change in concentration distribution of an adsorbed component proceeding in an adsorbent layer as a function of time. In this figure, the vertical axis represents a relative concentration of carbon dioxide in feed air. Also, the horizontal axis represents the packed height of an adsorbent layer which is normalized to be dimensionless.

The curves C respectively represent a mass transfer zone. C0 represents the mass transfer zone shortly after the beginning of adsorption, C1 represents the mass transfer zone at the point in time at which a certain time elapsed after the beginning of adsorption, and C2 represents the mass transfer zone after the elapse of more time.

Regarding the adsorption of carbon dioxide, it is known that the shape of the mass transfer zone C1 after a certain time elapsed is the same as the shape of the mass transfer zone C2 after the elapse of more time, and that the mass transfer zone proceeds while keeping a constant pattern.

FIG. 2 shows the mass transfer zone C2 when the front end thereof reaches the outlet end of an adsorbent layer. A time period from a point in time, at which feed air starts to be provided to an adsorbent layer, until a point in time, at which the front end of a mass transfer zone reaches the end of an adsorbent layer, is determined as an adsorption step time.

In FIG. 2, the region, in which an adsorbed component is saturated, (represented as the region M) is an adsorption equilibrium part. The total of the amount of an adsorbent in an adsorption equilibrium part and the amount of an adsorbent in the region, in which a mass transfer zone exists at this time (represented as the region N), is determined as the required amount of an adsorbent.

The reason why the amount of an adsorbent is determined in such a manner is that reducing the required amount of an adsorbent by increasing the utilization ratio η of an adsorbent is considered to be economically efficient. The relationship between an utilization ratio η and a mass transfer zone is represented by the following equation (2).

$$\eta = 1 - fZa/H \quad (2)$$

Here, f represents a constant determined by the shape of a mass transfer zone, and is normally ½. H represents the packed height of an adsorbent, and Za represents the length of a mass transfer zone.

From equation (2), it is understood that the utilization efficiency is increased as the length Za of a mass transfer zone becomes shorter with respect to the packed height H of an adsorbent.

Meanwhile, in the removal of carbon dioxide in air, it is typical to select about 0.2 m/s as an air velocity. This is because the aforementioned utilization ratio of an adsorbent is increased by shortening the length of a mass transfer zone and increasing an equilibrium adsorption part due to the selection of a relatively slow air velocity.

However, in the case where scale-up is performed while keeping a fixed air velocity, from the relationship of "an air velocity=an amount of feed air/a cross-sectional area of an adsorption column", the cross-sectional area of an adsorption column is increased in proportion with the amount of feed air. As a result, in a large-scale adsorber, the column diameter has to be larger than the packed height of an adsorbent.

In general, the distribution has to be considered so that feed air flows uniformly through the respective portions in an adsorbent layer. However, in the shape of an adsorber with a greater column diameter than the packed height of an adsorbent, it is difficult to uniformly flow feed air.

Also, the increase in the cross-sectional area of an adsorbent layer leads to the increase in the installation area of an adsorber. In order to decrease the installation area, for example, a radial flow adsorber and the like have been proposed.

In response to the demand to decrease the installation area of an adsorber, from the relationship of "an air velocity=an amount of feed air/a cross-sectional area of an adsorption column", a solution of accelerating a feed air velocity can be considered. For example, when an air velocity of 0.1 to 0.2 m/s (under a pressurized air condition), which is conventionally considered as typical in the removal of carbon dioxide in air, is changed into 0.2 to 0.4 m/s, the cross-sectional area of an adsorption column is downsized to ½.

However, in a conventional adsorber, when an air velocity is simply accelerated in this manner, adsorbent particles are fluidized in an adsorbent layer, causing a big problem in that the adsorption operation becomes unfeasible.

The fluidization of adsorbent particles can be prevented by increasing the diameter of an adsorbent from a conventional value of about 1.5 to 1.6 mm to about 1.7 to 5 mm so as to increase the weight of one particle in the case of a spherical adsorbent called a bead. Also, in the case of a cylindrical adsorbent called a pellet, the corresponding diameter may be increased from a conventional value of about 1.5 to 1.6 mm to about 1.7 to 5 mm. Hereinafter, the diameter of a spherical adsorbent or the corresponding diameter of a cylindrical adsorbent is referred to as a particle diameter.

However, when the particle diameter of an adsorbent is increased, the adsorption rate is decreased and the length of a mass transfer zone is elongated. Therefore, the required packed height of an adsorbent layer is increased, and the amount of an adsorbent is also increased.

As a result, it is revealed that the downsizing of an adsorber is difficult in the method of accelerating a velocity of feed air flowing into an adsorbent layer on the basis of the conventional design method.

This type of problem is common among general gas adsorption such as the removal of volatile organic substances in air, as well as the removal of carbon dioxide in air. For example, this problem is recognized when carbon monoxide contained in high purity nitrogen is removed by using an inorganic porous substance in which metallic nickel is supported.

In addition, it is also recognized when impurities in a variety of gases are removed, such as when oxygen in an inert gas is removed by the oxidation reduction reaction of copper. Furthermore, it is also recognized when a trace amount of carbon monoxide in air is removed by a hopcalite catalyst or a catalyst in which a noble metal is supported by an inorganic porous substance.

[Patent Reference 1] Japanese Unexamined Patent Application, First Publication No. 2002-346329

[Non-Patent Reference 1] "Kaisetsu Kagaku Kougaku" page 190 to 195, written by Takeuchi et. al., Baifukan, published Jan. 15, 1982

DISCLOSURE OF INVENTION

Therefore, objects of the present invention are to reduce the amount of a gas-purifying agent packed in a purifier and to downsize a purifier in the case where impurities in a gas, such as carbon dioxide in air or carbon monoxide in high purity nitrogen, are removed by a thermal swing adsorption method.

In order to solve the aforementioned problems, a first aspect of the present invention is a gas purification apparatus including a purifier in which a gas-purifying agent is packed, wherein a gas is fed into the purifier, and impurities in the gas are removed by a thermal swing adsorption method, in which an amount A of the gas-purifying agent packed in the purifier is determined as follows:

the amount A is determined such that an impurities-removing capacity possessed by half of the amount A of the gas-purifying agent is equal to the total amount of impurities in the gas to be purified, or more.

Here, the term of "the total amount of impurities in the gas to be purified" refers to the total amount of impurities to be fed into a purifier in one purification step.

In other words, the first aspect of the present invention is a gas purification apparatus including a purifier in which a gas-purifying agent is packed, wherein a gas is fed into the purifier, and impurities in the gas are removed by a thermal swing adsorption method, in which an amount A of the gas-purifying agent is determined such that an impurities-removing capacity possessed by half of the amount A of the gas-purifying agent is equal to the total amount of impurities in the gas to be purified in one purification step, and the amount of the gas-purifying agent packed in the purifier is the amount A or more.

In the gas purification apparatus of the present invention, it is preferable that the amount A of the gas-purifying agent be packed in the purifier to form a gas-purifying agent layer, and that in the gas-inlet side or gas-outlet side of the gas-purifying agent layer, the same type of gas-purifying agent be further packed at an amount of no more than 0.4 A.

Also, in the case where a purification step time is referred to as T, a gas velocity at the inlet of a gas-purifying agent layer is referred to as u, an equilibrium adsorption amount of the gas-purifying agent is referred to as q, and a conversion factor is referred to as α, the packed height H of the gas-purifying agent layer is preferably determined by the following equation (1):

$$H \geq \alpha \cdot T \cdot u / q \qquad (1).$$

Also, the gas-purifying agent is preferably an adsorbent.

Also, the gas-purifying agent is preferably an inorganic porous substance supporting a metal.

Also, the particle diameter of the adsorbent is preferably 1.7 to 5 mm.

A second aspect of the present invention is a method for gas purification including removing impurities in a gas by using a gas purification apparatus of the present invention and a thermal swing adsorption method.

In a method for gas purification of the present invention, in the case where the gas-purifying agent is the adsorbent, the gas velocity at the inlet of the gas-purifying agent layer is preferably 0.25 to 0.4 m/s.

Also, in the case where the gas-purifying agent is the adsorbent, the temperature of the gas at the inlet of the gas-purifying agent layer is preferably 5 to 45° C.

According to the present invention, because a gas-purifying agent, which can remove at least double amount of the total amount of impurities flowing into a gas-purifying agent layer in a gas purification step, is packed in a purifier, a mass transfer zone can be formed in the whole region of a gas-purifying agent layer. Therefore, the limitation on a gas velocity for forming the adsorption equilibrium region in a gas-purifying agent layer is relaxed, and a velocity can be increased. As a result, the cross-sectional area of a gas-purifying agent layer can be decreased, and hence, the installation area of a purifier can be decreased.

Also, in the present invention, because the formation of an adsorption equilibrium part is not required, it becomes possible to select a relatively short purification step time. Accordingly, the amount of a gas-purifying agent to be packed in a purifier can be reduced, and hence, a purifier can be downsized.

BEST MODE FOR CARRYING OUT THE INVENTION

First Embodiment

First, an embodiment of the present invention, in which carbon dioxide in air is removed by an adsorbent, is described in detail.

In the present invention, a gas-purifying agent layer refers to a layer formed by packing a gas-purifying agent in a purifier. Also, an adsorbent is a type of a purifying agent, and the term of an adsorbent layer refers to a layer formed by packing an adsorbent in a purifier.

Figure 1:
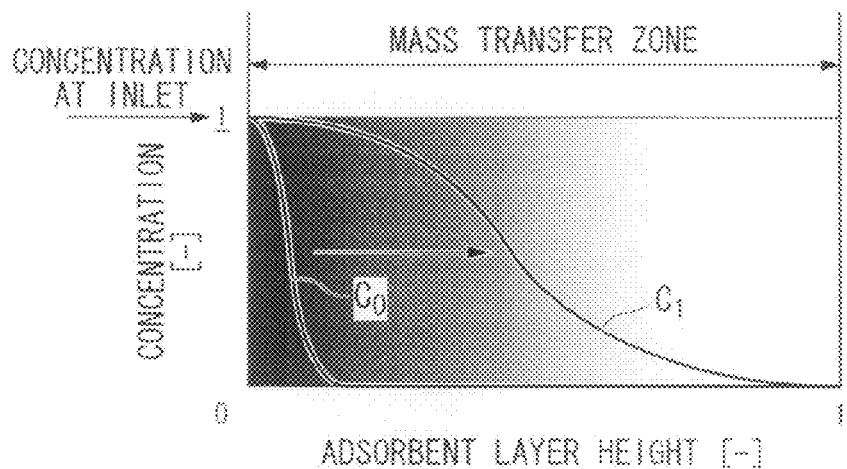
FIG. 1 is a graph explaining the concept of the present invention for calculating the thickness of an adsorbent layer.

FIG. 1 schematically represents the concept until a constant pattern of concentration distribution of impurities in the present embodiment is formed. In FIG. 1, the vertical axis represents a relative concentration of carbon dioxide in feed air. Also, the horizontal axis represents the packed height of an adsorbent layer which is normalized to be dimensionless. The point zero on the horizontal axis is the inlet of air, and the point 1 is the outlet of purified air.

When an adsorption step is started, feed air is fed into an adsorbent layer from the left side of FIG. 1. The concentration distribution C0 which is formed in the vicinity of the inlet as a transitional state is elongated in front as a lapse of time, and the concentration distribution C1 with a constant pattern is formed after a certain time.

$C_1$ in FIG. 1 represents the point in time at which the front end of the concentration distribution has just reached the outlet of air. If the adsorption step is continued as is, so-called breakthrough occurs, and the concentration of carbon dioxide in the purified air is increased. Therefore, the adsorption step is finished at the point in time at which the front end of the concentration distribution reaches the outlet.

In FIG. 1, carbon dioxide contained in feed air is adsorbed in the lower region of the curved line of the concentration distribution C1. It is typical to consider that the shape of the concentration distribution C1 is point symmetrical at the center in the field of adsorption technology. Accordingly, the adsorbent utilization ratio of the region shown in FIG. 1 becomes ½ (50%) (the case of f=½ in equation (2)).

It holds true only in an ideal model of the present invention to determine the point in time, at which the point in time at which the constant pattern of the concentration distribution shown in FIG. 1 is formed coincides with the point in time at which the front end of the concentration distribution reaches the outlet end of purified air, as the end time of adsorption time, and is practically difficult in terms of the variations of adsorption operation conditions.

For example, when having a look at the temperature of feed air as a condition of adsorption operation, feed air is preliminary cooled by a cooler provided on the outlet of an air compressor, cooled by a mechanical freezer or the like to about 10° C., and then fed into an adsorber. The aforementioned preliminary cooling is typically water-cooling. Because the temperature of cooling water varies by the effect of outside air, the temperature of air released from a refrigerator also varies. Because an adsorption capacity has temperature dependency, the length of a mass transfer zone is extended and shortened by the effect of the temperature of feed air. This effect is greater in the case of the present invention in that only a mass transfer zone exists in an adsorbent layer.

Also, a gas volume is affected by the temperature of feed air, and so a gas velocity also varies every moment due to the effect of the temperature. The length of a mass transfer zone is subjected to this effect.

The adsorption operation conditions to be affected include the variation of the pressure of feed air. Above all, the concentration of carbon dioxide to be removed is not fixed at all times.

Therefore, practically, it is appropriate to add an amount 0.4 A of an adsorbent which corresponds to a 40% margin of the amount A of an adsorbent obtained from the ideal model shown in FIG. 1. This 40% margin is based on the consideration of the aforementioned variations of the adsorption operation conditions.

Specifically, in the case where the 40% margin-corresponding amount is added to the air-inlet side, when the front end of a mass transfer zone reaches the air outlet, the adsorbent utilization ratio at this time becomes 64.3%.

Also, in the case where the adsorption step time is finished when a mass transfer zone extended from the air-inlet part has just taken a constant pattern, i.e. in the case where an unused adsorbent exists at 40% in the forward of a mass transfer zone, the adsorbent utilization rate at this time becomes 35.7%.

Figure 2:
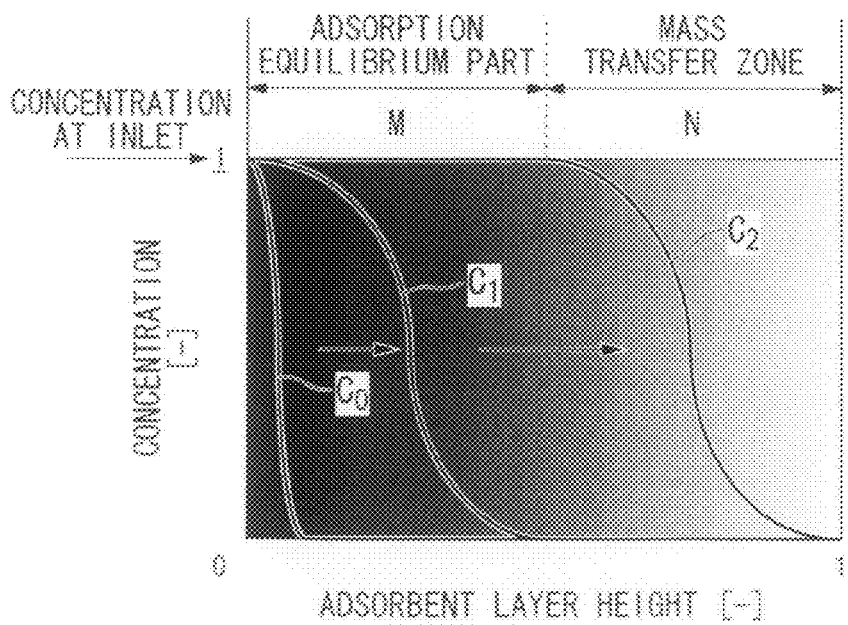
FIG. 2 is a graph explaining a conventional concept for calculating the thickness of an adsorbent layer.

In contrast to the conventional concept of an adsorber design as shown in FIG. 2, an adsorption equilibrium part is not existed according to the present invention. That is, since an adsorbent layer only include a mass transfer zone, it becomes possible to select a relatively short adsorption step time. Such a short adsorption step time means the reduction in the load of carbon dioxide, resulting in the reduction in the amount of an adsorbent.

In the present embodiment, the amount A is determined so that a carbon dioxide-adsorbed amount possessed by half of the amount A of a carbon dioxide adsorbent is equal to the total amount of carbon dioxide in a gas to be adsorbed, and the amount of a carbon dioxide adsorbent packed in a purifier is determined to be the amount A or more. Accordingly, only the lower limit is defined. In a practical apparatus, excessive packing of an adsorbent not only increases the cost of an adsorbent, but also necessitates a large amount of heat required for regeneration, and therefore, the upper limit is determined naturally.

For example, 50%-packing or more as a margin is not practical. Also, the increases of an adsorbent amount and an adsorption step time result in the formation of an adsorption equilibrium part in an adsorbent layer, which is therefore similar to the conventional design method.

In the present invention, an adsorbent is packed at 40% more than the amount required for the ideal model. That is, the so-called margin is determined to be 40% as a typical value although it can not be unconditionally defined due to the dependencies on adsorption operation conditions.

Meanwhile, in equation (1) of $H \geq \alpha \cdot T \cdot u/q$, by shortening an adsorption step time T, the packed height H of an adsorbent layer can be shortened as much as possible. However, this relationship is not practically feasible unless the height H of a carbon dioxide adsorbent layer, which corresponds to a relatively fast gas velocity, is selected. Furthermore, because the regeneration of an adsorbent is performed by heating, it is necessary to perform heating with the limited amount of a regeneration gas and then cooling to the temperature of the adsorption. Therefore, for example, a regeneration step time of 30 minutes is too short. Because the regeneration is performed during the adsorption step in another adsorption column, it is convenient that an adsorption step time T is the same as a regeneration step time, and an adsorption step time T that can be actually used is appropriately 1.5 hours to 3 hours.

Meanwhile, in the concept of the present invention in that only a mass transfer zone exists in an adsorbent layer, when a relatively slow air velocity, which is considered to be typical in a conventional adsorber, is used, the length of a mass transfer zone is shortened, and the adsorbent layer is shortened too much in comparison with the practical height.

To describe it in detail, in an adsorber which removes carbon dioxide in a cryogenic air separation apparatus having an air amount of several tens of thousands $m^3/h$, the diameter of an adsorption column becomes several meters. For example, in Table 5 of Japanese Unexamined Patent Application, First Publication No. 2002-346329, the length of a mass transfer zone of the conventional example is shown to be 132 mm (see Patent Document 1). The difficulty of uniformly packing an adsorbent to a height of 132 mm in a column having a diameter of several meters can be easily imagined. Moreover, even if such a packing can be performed, unless feed air uniformly passes through an adsorbent layer, there is another problem in that a partial breakthrough occurs.

In the present invention, an amount of adsorbent, which can remove at least double amount of the total amount of impurities flowing into the adsorbent layer in the adsorption step, is packed in an adsorber, so that a mass transfer zone can be formed in the whole region of an adsorbent layer. Accordingly, the limitation on a gas velocity for making an adsorption equilibrium part appear in an adsorbent layer is mitigated, and it was found that the above problems can be solved by greatly increasing the velocity of feed air more than that of the conventional method. That is, the inflow velocity of feed air is set within 0.25 to 0.4 m/s, and the particle diameter of an adsorbent is set within 1.7 to 5.0 mm in order to prevent fluidization of an adsorbent due to a high velocity of feed air.

Both of the high feed air velocity and the use of a large particle diameter have an effect to elongate the length of a mass transfer zone. Therefore, in the case of the present invention, provided that only a mass transfer zone exists in an adsorbent layer, when an appropriate velocity and a particle diameter corresponding to this velocity are selected, a packed height of an adsorbent layer capable of appropriately removing carbon dioxide can be achieved.

Moreover, in the present invention, it was found that "the concept of the present invention in that only a mass transfer zone exists in an adsorbent layer" shown in FIG. 1 is feasible when an adsorbent is selected so that the length of a mass transfer zone of an adsorbent, which has the aforementioned air velocity and an adsorbent particle diameter corresponding to this velocity, is equal to or less than the height of a carbon dioxide adsorbent layer calculated by an air velocity standard.

In the case where the velocity of feed air is less than 0.25 m/s, adsorption conditions become the same as conventional ones. In the case where the velocity of feed air exceeds 0.4 m/s, the particle diameter has to be 5 mm or more in order to prevent the fluidization of adsorbent particles, but under conditions where an adsorbent having a particle diameter of 5 mm or more is used, the length of a mass transfer zone exceeds the practical range.

A feed air velocity and the diameter of an adsorbent particle to be used are related to each other by the Ergun's pressure loss equation from the viewpoint of the prevention of fluidization of an adsorbent. When an air velocity is determined, it is effective to use an adsorbent having as small a particle diameter as possible within the range which does not allow an adsorbent to be fluidized, in order to prevent an unnecessary elongation of the length of a mass transfer zone.

Specifically, in order to calculate the height of a carbon dioxide adsorbent layer, the above equation (1) is used.

That is, in the case where an adsorption step time is referred to as T, an air velocity at the inlet of an adsorbent layer is referred to as u, an equilibrium adsorption amount of a carbon dioxide adsorbent is referred to as q, and a conversion factor is referred to as $\alpha$, the height H of a carbon dioxide adsorbent layer can be determined by the following equation (1):

$$H \geq \alpha \cdot T \cdot u/q \qquad (1).$$

Here, the dimensions of the respective parameters are such that a unit of an adsorption step time is hour, a unit of air velocity is m/s, a unit of equilibrium adsorption amount is mol/kg, and a unit of adsorbent layer height is m. A conversion factor $\alpha$ matches the dimensions of the left and right terms in equation (1), and also includes the conversion of the pressure and the temperature for air purification step conditions. The respective parameters are not limited to the aforementioned dimensions when adjusted by a conversion factor $\alpha$.

An equilibrium adsorption amount q of carbon dioxide in equation (1) is described. As a usual carbon dioxide adsorbent, there are Ca-A zeolite and Na—X zeolite (including a binderless type and a low silica X type (LSX type which a ratio of silica and alumina forming the structure is about 1.0 to 1.15)), which are generally used for an adsorber removing carbon dioxide in a cryogenic air separation apparatus.

An equilibrium adsorption amount q of carbon dioxide in equation (1) is obtained from the experiment in which air containing carbon dioxide at a concentration of 400 volume ppm is passed through an adsorbent layer at a pressure of 550 kPa (absolute pressure) and an adsorption temperature of 10° C., and is within a range of approximately 1.0 to 1.8 mol/kg. Specifically, although there is a difference between manufacturers of adsorbents, an equilibrium adsorption amount q is 1.0 in binder-containing Na—X zeolite, 1.3 in binderless Na—X type, and 1.8 in LSX type Na—X zeolite.

In addition, the temperature of feed air during flowing into a carbon dioxide adsorbent layer is set within 5 to 45° C., and preferably 10 to 25° C. An equilibrium adsorption amount of a carbon dioxide adsorbent has temperature dependency. The air temperature is preferably as low as possible because an adsorption amount is greater as an adsorption temperature is lower. However, in the case where the object is to purify feed air for a cryogenic air separation apparatus, it is not preferable to cool down a large amount of air by a refrigerator or the like in terms of power consumption. Conversely, an adsorption amount is lowered as the air temperature is increased. Therefore, the temperature is preferably within a range of 5 to 45° C.

Also, a carbon dioxide adsorbent used in the present embodiment is zeolite, including Na—X zeolite, Ca-A zeolite, and the like.

In an adsorber for removing impurities, which is provided in the former part of a cryogenic air separation apparatus, a moisture adsorbent and the aforementioned carbon dioxide adsorbent are laminated in this order from the inlet side of feed air. As this moisture adsorbent, activated alumina, silica gel, Na—X zeolite, Ca-A zeolite, Na-A zeolite, K-A zeolite, or the like are used.

As described above, in summary of the operation conditions in the present embodiment, adsorption operation becomes feasible by setting conditions such that zeolite is used as the carbon dioxide adsorbent, a velocity of feed air during flowing into an adsorbent layer is 0.25 to 0.4 m/s, the particle diameter of a carbon dioxide adsorbent is 1.7 to 5 mm, and the temperature of feed air is 5 to 45° C.

Second Embodiment

Next, an embodiment in which carbon monoxide in high purity nitrogen is removed by using, as a gas-purifying agent, a reactant formed of an inorganic porous substance in which nickel metal is supported.

This reactant is reacted with a trace amount of carbon monoxide and converted into metal carbonyl, and thereby carbon monoxide can be removed. The regeneration of the reactant is performed by allowing it in a heated state and flowing hydrogen so as to reduce it.

Therefore, at least two purification columns, in which the aforementioned reactant is packed, are provided and operated while alternately switching between a removal step and a regeneration step, and thereby carbon monoxide in high purity nitrogen can be continuously removed.

In this removal operation, conventionally, purification columns filled with a large amount of reactant are used, and the switching time is set long, such as 2 to 3 days. In this conventional method, a large amount of reactant has to be used, requiring large size purification columns.

In this manner, the removal of carbon monoxide in high purity nitrogen using the reactant also has similar problems to those of the removal of carbon dioxide in air using an adsorbent as described above.

Therefore, the present inventors have examined whether or not a similar concept to that of the above-mentioned case of removing carbon dioxide in air can be used for this case, and found that the case can be solved by a similar method.

The reactant removes carbon monoxide by chemical reaction. However, carbon dioxide is physically adsorbed to an adsorbent and removed. Although the reaction mechanisms are different, these cases are phenomenally similar. The reaction serially progresses from the gas-inlet side of a packed layer filled with the reactant. A part corresponding to an adsorption equilibrium part and a zone corresponding to a mass transfer zone exist, and these are considered to gradually move to the gas-outlet side.

Therefore, the amount A of a reactant may be determined such that a carbon monoxide-removing capacity possessed by half of the amount A of a reactant is equal to the total amount of carbon monoxide in high purity nitrogen to be treated, and the packed amount of a reactant forming a purification layer may be the amount A or more. Also, a margin of a reactant corresponding to 0.4 A can be also packed in the gas-inlet side or the gas-outlet side of a purification layer.

In addition to the two embodiments described above, as stated previously, the present invention may be also similarly applied for removing oxygen in an inert gas by the oxidation reduction reaction of copper, and for removing a trace amount of carbon monoxide in air by a hopcalite catalyst or a catalyst in which a noble metal is supported by an inorganic porous substance.

EXAMPLES

Hereinafter, examples are described.

Example 1

Here is a description of the case of purifying air having a feed air pressure: 550 kPa (absolute pressure), an air temperature: 10° C., an air flow rate: 30,000 Nm³/hour, and a carbon dioxide content: 400 ppm (volume).

In equation (1), in the case of $\alpha=1.04$, $T=2$ hours, $u=0.33$ m/s, and $q=1.33$ mol/kg, the result became $H \geqq 0.52$ m.

Here, when the first aspect of the present invention was examined, the load of carbon dioxide flowing into an adsorbent layer in the purification step became as follows.

$$\text{Load} = 30000 \ [m^3/hour] \times 400 \ [ppm] \times 10^{-6} \times 2 \ [hour] \div 0.0224 \ [Nm^3/mol] = 1072 \ [mol]$$

$$\text{Column diameter} = (30000 \ [N \ m^3/hour] \times 101 \ [kPa] \div 550 \ [kPa] \times 283 \ [K] \div 273 \ [K] \times 4 \div \pi \div 0.33 \ [m/s] \div 3600 \ [s/hour])^{0.5} = 2.47 \ [m]$$

When an adsorbent having a packed density of 650 kg/m³ was used, the adsorption capacity possessed by half of the amount of an adsorbent was as follows.

$$\text{Adsorption capacity possessed by half of amount of adsorbent} = 2.47^2 \times \pi \div 4 \times 0.52 \times 650 \times 1.33 \div 2 = 1077 \ [mol]$$

Accordingly, adsorption capacity possessed by half of amount of adsorbent $\geqq$ load.

As mentioned above, when an adsorbent is packed in a column having a diameter of 2.47 m, the thickness of an adsorbent layer becomes 0.52 m. As a result, the packed amount of an adsorbent becomes 2.49 m³.

Comparative Example 1

The following were assumed: a feed air pressure: 550 kPa (absolute pressure), an air temperature: 10° C., an air amount: 30,000 Nm³/hour, and a carbon dioxide content: 400 ppm (volume).

The following case was considered: adsorption equilibrium amount=1.33 [mol/kg], length of mass transfer zone=140 mm, air velocity=0.19 m/s, and adsorption step time=4 hours.

$$\text{Load} = 30000 \ [Nm^3/hour] \times 400 \ [ppm] \times 10^{-6} \times 4 \ [hour] \div 0.0224 = 2143 \ [mol]$$

$$\text{Column diameter} = (30000 \ [Nm^3/hour] \times 101 \ [kPa] \div 550 \ [kPa] \times 283 \div [K] \div 273 \ [K] \times 4 \div \pi \div 3600 \div 0.19)^{0.5} = 3.26 \ [m]$$

Because the adsorbent packed density was 650 kg/m³ and the adsorbed amount in a mass transfer zone was half of the equilibrium adsorption amount, the result became such that:

$$\text{Height of adsorbent layer} = 2143 \ [mol] 1.33 \ [mol/kg] \div 650 \ [kg/m^3] \div \pi \div 4 \div 3.26^2 + 0.14 \ [m] \div 2 = 0.37 \ [m].$$

As mentioned above, when an adsorbent is packed in a column having a diameter of 3.26 m, the thickness of an adsorbent layer becomes 0.37 m. As a result, the packed amount of an adsorbent becomes 3.09 m³.

When comparing Example 1 and Comparative example 1, in Comparative example 1, the column diameter is large, and the amount of treated carbon dioxide is approximately double, and thus the amount of an adsorbent is also large. This is because the adsorption step time was determined to be 4 hours in Comparative example 1. The reason why such a long adsorption step time is selected in the conventional cases is that, as described above, the length of a mass transfer zone is about 132 mm at a slow air velocity, and does not sufficiently correspond to the packed height of a mass transfer zone in an adsorption step time of 2 to 3 hours even if the height of an equilibrium adsorption part is added thereto.

Example 2

Hereinafter, an example of the second embodiment is described.
  A carbon monoxide concentration in feed nitrogen: 2 ppm
  A feed nitrogen pressure: 500 kPa (absolute pressure)
  A feed nitrogen temperature: 25° C.
  A feed nitrogen velocity in a purification column: 0.4 m/s
  A reactant: 4 mm diameter pellet
  Throughput: 100 Nm³/hr
  A purification column diameter: 0.14 m
  From $H \geq \alpha \cdot T \cdot u/q$ (1), in the case where $\alpha = 3.88 \times 10^{-3}$, T=6 hours, u=0.4, and q=0.05 mol/kg, packed height H=0.19 m.

After the feed nitrogen was purified in the above conditions, carbon monoxide was not detected in the purified nitrogen. The packed amount of the reactant in this case was only 2.2 kg.

Comparative Example 2

Carbon monoxide concentration in raw material nitrogen: 2 ppm
  A feed nitrogen pressure: 500 kPa (absolute pressure)
  A feed nitrogen temperature: 25° C.
  A feed nitrogen velocity in a purification column: 0.2 m/s
  A reactant: 2 mm diameter pellet
  Throughput: 100 Nm³/hr
  A purification column diameter: 0.2 m
  From (Packed height H/purification column diameter D)≥1, a packed height: 0.2 m.
  A reactant-packed amount: 4.7 kg
  A reaction step time: 80 hours After the feed nitrogen was purified in the above conditions, carbon monoxide was not detected in the purified nitrogen.

INDUSTRIAL APPLICABILITY

According to the present invention, the amount of a gas-purifying agent to be packed in a purifier can be reduced, and a purifier can be downsized. Therefore, the present invention is industrially useful.

The invention claimed is:

1. A method for gas purification that uses a gas purification apparatus comprising a purifier in which a gas-purifying agent is packed, the method comprising: feeding a gas into the purifier so that impurities in the gas are removed by a thermal swing adsorption method, wherein an amount A of the gas-purifying agent is determined such that an impurities-removing capacity possessed by half of the amount A of the gas-purifying agent is equal to the total amount of impurities in the gas to be purified in one purification step, the amount A or more and no more than 1.4 A of the gas-purifying agent is packed in the purifier to form a gas-purifying agent layer, and the gas velocity at the inlet of a layer of the gas-purifying agent is set within a range from 0.25 to 0.4 m/s to form a mass transfer zone and no adsorption equilibrium region in the whole region of the gas-purifying agent layer in the gas purification step; wherein, in the case where a purification step time is referred to as T, a gas velocity at the inlet of a gas-purifying agent layer is referred to as u, an equilibrium adsorption amount of the gas-purifying agent is referred to as q, and a conversion factor is referred to as α, the packed height H of the gas-purifying agent layer is determined by the following equation (1):

$$H \geq \alpha \cdot T \cdot u/q \qquad (1).$$

2. The method for gas purification according to claim 1, wherein the gas-purifying agent is an adsorbent.

3. The method for gas purification according to claim 2, wherein the particle diameter of the adsorbent is 1.7 to 5 mm.

4. The method for gas purification according to claim 2, wherein the temperature of the gas at the inlet of the gas-purifying agent layer is 5 to 45° C.

5. The method for gas purification according to claim 1, wherein the gas-purifying agent is an inorganic porous substance supporting a metal.

* * * * *